United States Patent [19]
Frische

[11] 3,858,716
[45] Jan. 7, 1975

[54] SPINNER ASSEMBLY MECHANISM

[75] Inventor: Dale George Frische, Belleville, Ill.

[73] Assignee: Indian Head Inc., New York, N.Y.

[22] Filed: Nov. 8, 1973

[21] Appl. No.: 413,921

[52] U.S. Cl.................. 198/241, 198/179, 118/322
[51] Int. Cl............................................ B65g 47/24
[58] Field of Search ........... 198/179, 240, 241, 242, 198/243, 160, 165; 214/1 BA; 118/322

[56] References Cited
UNITED STATES PATENTS

| | | | |
|---|---|---|---|
| 1,926,465 | 9/1933 | Townsend........................... | 118/322 |
| 2,838,025 | 6/1958 | Miller et al. ........................ | 198/241 |
| 3,262,545 | 7/1966 | Worsencroft....................... | 198/165 |
| 3,777,875 | 12/1973 | Sobran............................... | 198/179 |

Primary Examiner—Richard A. Schacher
Assistant Examiner—Joseph E. Valenza
Attorney, Agent, or Firm—Brumbaugh, Graves, Donohue & Raymond

[57] ABSTRACT

A spinner assembly mechanism suitable for use in the high speed spray coating of articles, such as bottles, comprises a drive belt for frictional engagement with rotatable chuck collars suspending the articles as well as motive means for driving the belt and means for supporting an overhead chuck conveyor.

5 Claims, 3 Drawing Figures

SPINNER ASSEMBLY MECHANISM

The present invention relates to a spinner assembly mechanism.

In my copending U.S. application Ser. No. 404,034, filed Oct. 5, 1973 (Attorney's Docket No. 21954), the disclosure of which is hereby incorporated by reference herein, there is disclosed a high speed bottle coating system and process which comprises among its elements an overhead chuck conveyor for rapid transporting of a file of suspended bottles through one or more spray coating stations having within the stations means for rotating or spinning the suspended bottles while they are being spray coated so as to insure a uniform coating therearound. The present invention is directed to a particularly advantageous form of an exemplary rotator or spinner suitable for use in such a system and process or elsewhere.

In general, the spinner assembly mechanism of the present invention comprises a track for supporting an overhead chuck conveyor having a plurality of spaced vertically retractable chucks with rotatable collars enclosing chuck fingers for suspending articles, such as bottles, therefrom; a continuous flexible drive belt having an inner course for frictional engagement with the rotatable collars to effect rotating or spinning of the suspended articles; and operatively connected motive means for driving the belt.

In the preferred embodiments of the spinner assembly mechanism, there is present means for tensioning the inner course of the drive belt into frictional engagement with the rotatable collars of the chucks and also means for opposing the transverse force of the inner course of the drive belt against the collars to resist lateral displacement of the chucks away from the inner course of the drive belt. The aforementioned tensioning means comprises a plurality of pivotal spring-loaded lever arms with idler sheaves pressing outwardly against the inner course of the drive belt and the aforementioned opposing means comprises a stationary detention bar opposite the inner course of the drive belt for engaging a plurality of the chucks above the collars.

The invention will be more specifically described in connection with the accompanying drawings wherein.

Figure 1:
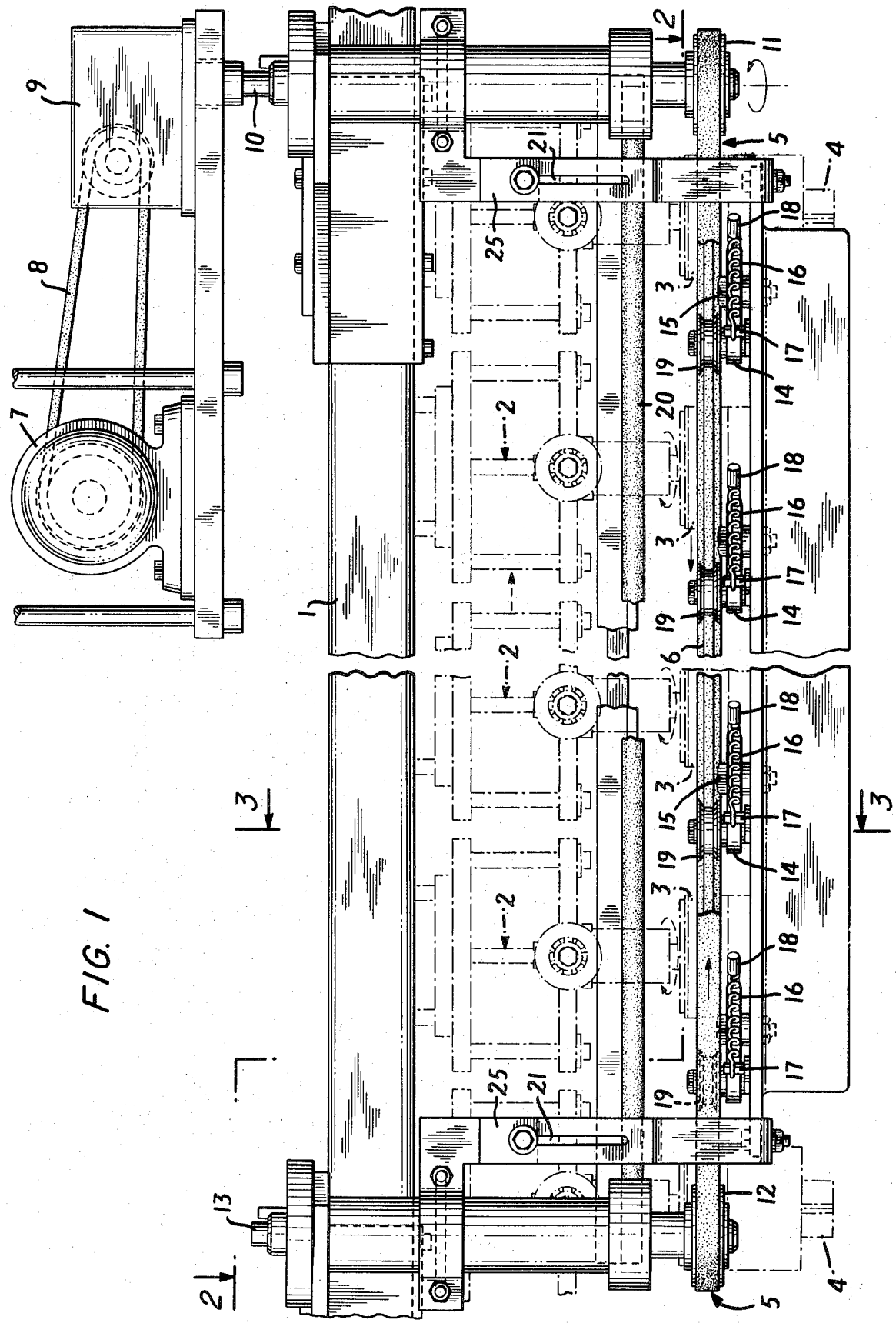
FIG. 1 is a front elevational view of the spinner assembly mechanism.

The spinner assembly mechanism has a housing or track 1 for supporting an overhead chuck conveyor having a plurality of spaced vertically retractable chucks 2 with rotatable collars 3 enclosing chuck fingers 4 for suspending articles, such as bottles, (not shown) therefrom. A continuous flexible drive belt 5 has an inner course 6 for frictional engagement with the rotatable collars 3 to effect rotating or spinning the suspended articles. The drive belt 5 is driven by operatively connected motive means.

The above-mentioned operatively connected motive means comprises a motor 7 connected by a drive belt 8 to a gear reduction box 9. The gear reduction box 9 rotates a drive shaft 10 having locked thereon a drive sheave 11. One terminus of the drive belt 5 is in frictional engagement with the drive sheave 11 so as to impart linear rotation to the drive belt 5. The other terminus of the drive belt 5 passes around idler sheave 12 which is locked on a rotatable idler shaft 13.

In the preferred embodiments of the spinner assembly mechanism of the invention there is present means for tensioning the inner course 6 of the drive belt 5 into frictional engagement with the rotatable collars 3 of the chucks 2. This tensioning means comprises a plurality of lever arms 14 having fulcrum or pivot pins 15 and which are loaded by springs 16. The springs 16 extend from stationary pins 17 to rods 18 affixed to one end of the lever arms 14. At the opposite end of the lever arms 14 there are rotatable idler sheaves 19 which press outwardly against the inner course 6 of the drive belt 5.

The preferred embodiments of the spinner assembly mechanism of the invention further comprise means for opposing the transverse force of the inner course 6 of the drive belt 5 against the collars 3 of the chucks 2 to resist lateral displacement of the chucks 2 away from the inner course 6 of the drive belt 5. This opposing means comprises a stationary detention bar 20 of low friction material, e.g., nylatron, opposite the inner course 6 of the drive belt 5 for engaging a plurality of the chucks 2 above the collars 3.

Slots 21 and 22 within support bracket 25 and slots 23 and 24 within support plates 26 and 27, respectively, permit lateral and vertical adjustment and relative positioning of the elements of the spinner assembly mechanism.

Figure 2:
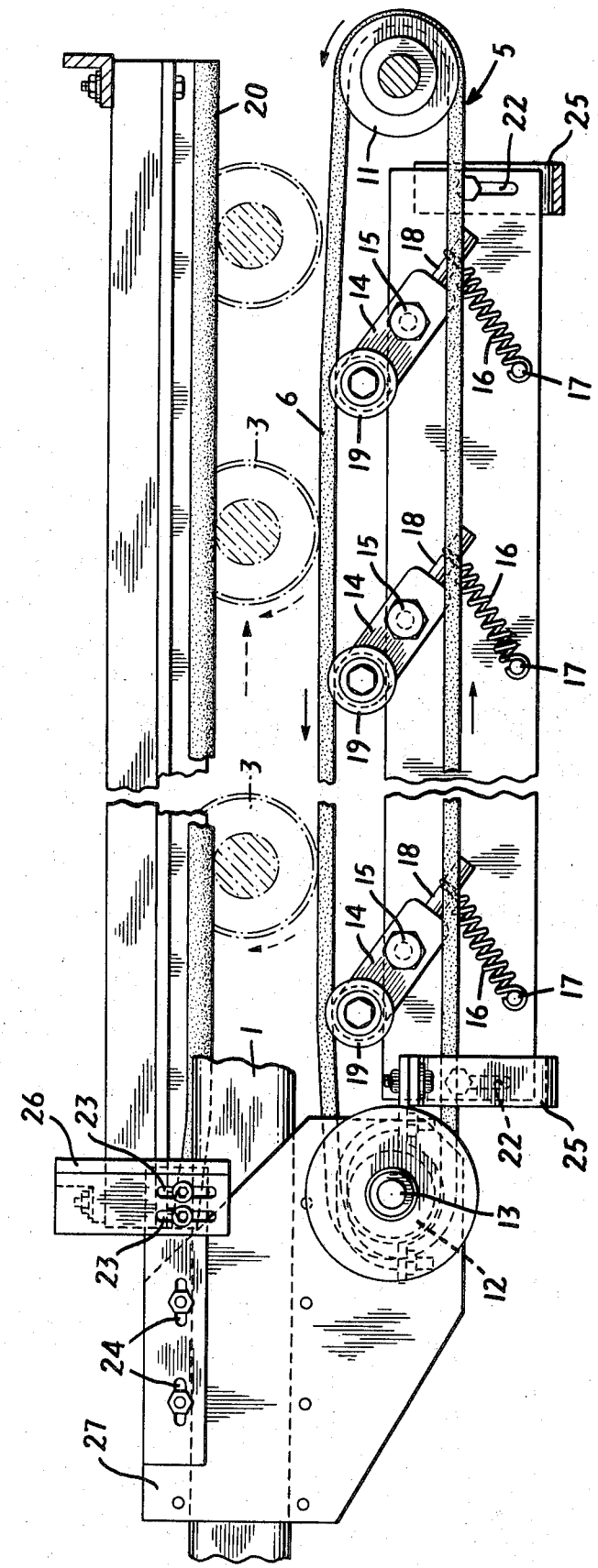
FIG. 2 is a top plan view of the spinner assembly mechanism taken on section line 2—2 of FIG. 1.
Figure 3:
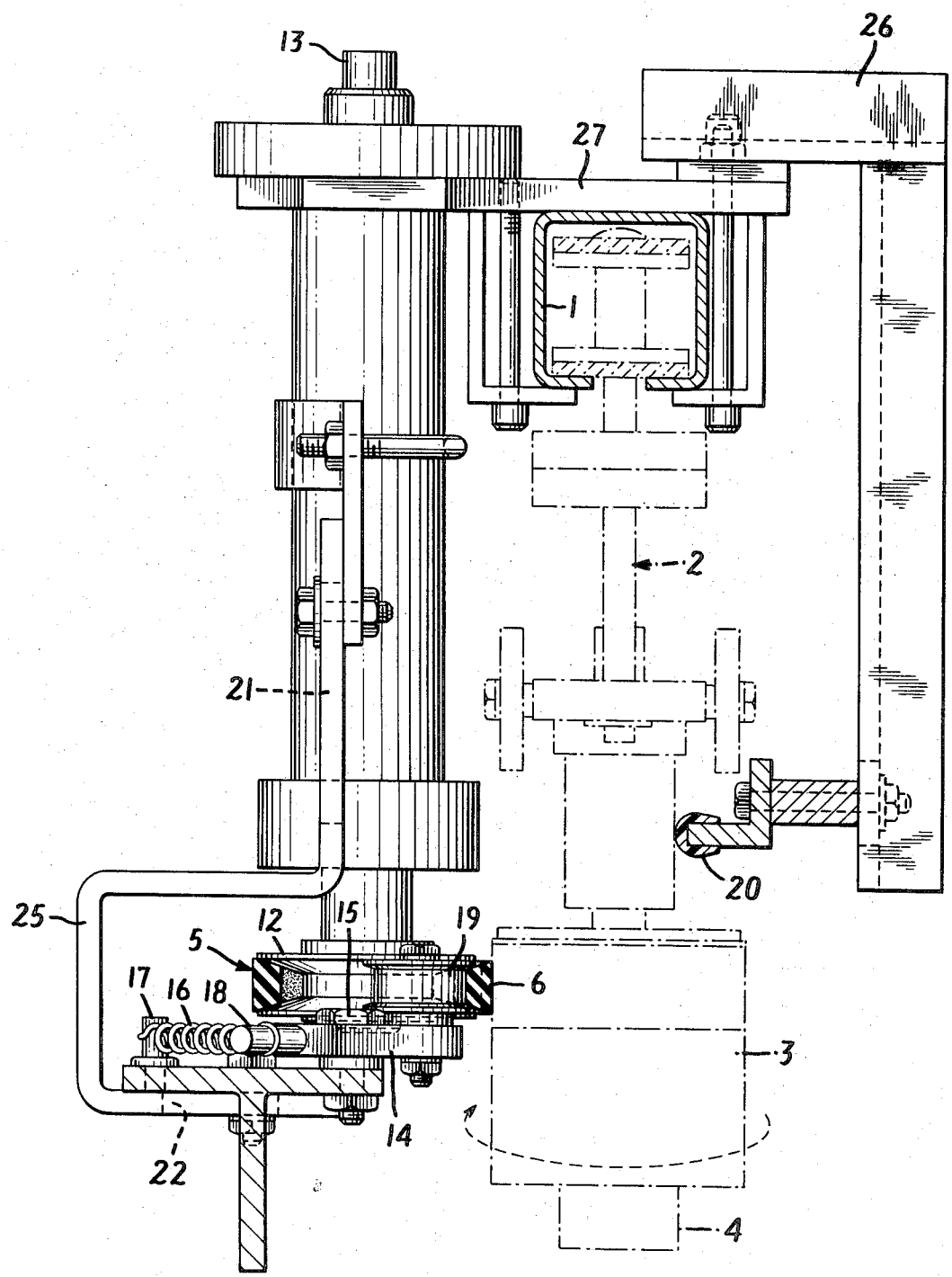
FIG. 3 is an end elevational view of the spinner assembly mechanism taken on section line 3—3 of FIG. 1.

In operation, the overhead chucks 2 travel along housing or track 1 (from left to right in FIGS. 1 and 2 as indicated by the pertinent directional arrows) with each chuck 2 having an article, such as a bottle, (not shown) gripped and suspended from chuck fingers 4. Frictional engagement of the chuck rotatable collars 3 with the inner course 6 (driven right to left in FIGS. 1 and 2 as indicated by the pertinent directional arrows) of the drive belt 5 causes rotation or spinning (clockwise as indicated in FIGS. 1–3 by the pertinent directional arrows) of the suspended articles or bottles as they are spray coated in traversing through a spray coating station to achieve uniform spray coating thereof.

It will be appreciated that various modifications and changes may be made in the apparatus of the invention in addition to those mentioned above by those skilled in the art without departing from the essence of the invention and that accordingly the invention is to be limited only within the scope of the appended claims.

What is claimed is:

1. A spinner assembly mechanism which comprises a track for supporting an overhead chuck conveyor having a plurality of spaced vertically retractable chucks with rotatable collars enclosing chuck fingers for suspending articles therefrom, a continuous flexible drive belt having an inner course for frictional engagement with said rotatable collars to effect rotating or spinning of the suspended articles, and operatively connected motive means for driving said belt.

2. The spinner assembly mechanism as defined by claim 1 which further comprises means for tensioning the inner course of said drive belt into frictional engagement with said rotatable collars.

3. The spinner assembly mechanism as defined by claim 2 wherein said tensioning means comprises a plurality of pivotal spring-loaded lever arms with idler sheaves pressing outwardly against the inner course of said drive belt.

4. The spinner assembly mechanism as defined by claim 2 which further comprises means for opposing the transverse force of the inner course of said drive belt against said collars to resist lateral displacement of said chucks away from the inner course of said drive belt.

5. The spinner assembly mechanism as defined by claim 4 wherein said opposing means comprises a stationary detention bar opposite the inner course of said drive belt for engaging a plurality of said chucks above said collars.

* * * * *